United States Patent [19]

Mitchell

[11] 4,016,625
[45] Apr. 12, 1977

[54] APPARATUS FOR SIZING AND DEHEADING SHRIMP

[76] Inventor: Edwin B. Mitchell, P.O. Box 1042, Beaufort, S.C. 29902

[22] Filed: July 19, 1976

[21] Appl. No.: 706,832

Related U.S. Application Data

[63] Continuation of Ser. No. 512,452, Oct. 7, 1976, abandoned.

[52] U.S. Cl. .................................... 17/71; 209/99
[51] Int. Cl.² ........................................ A22C 29/02
[58] Field of Search ............. 17/71, 45, 48, 52, 63; 209/99, 97, 98; 198/173

[56] References Cited

UNITED STATES PATENTS

| | | | |
|---|---|---|---|
| 814,762 | 3/1906 | Yeager | 209/99 |
| 1,190,067 | 7/1916 | Zenge et al. | 209/99 |
| 1,367,546 | 2/1921 | Hirth et al. | 17/63 |
| 2,423,174 | 7/1947 | Brown | 17/63 |
| 2,546,414 | 3/1951 | Abbott | 17/48 |
| 2,958,896 | 11/1960 | Merrick | 17/71 |
| 3,451,100 | 6/1969 | Lee | 17/71 |
| 3,698,038 | 10/1972 | Jones, Jr. | 17/71 |
| 3,750,234 | 8/1973 | Rodgers et al. | 17/71 |
| 3,784,007 | 1/1974 | Skrmetta | 209/99 |

*Primary Examiner*—Louis G. Mancene
*Assistant Examiner*—James D. Hamilton
*Attorney, Agent, or Firm*—Bailey, Dority & Flint

[57] ABSTRACT

Apparatus for sizing and deheading shrimp is illustrated wherein an open, elongated trough has a pair of sides which diverge laterally outwardly from adjacent one end of the trough toward the other with a conveyor for moving shrimp along the trough permitting progressively larger shrimp to fall through the open bottom of the trough, and a number of conveyors are provided for carrying the shrimp thus sized, into contact with a stationary blade in such a manner that the head is pushed over the blade and body passed under the blade and the heads and bodies collected separately.

8 Claims, 11 Drawing Figures

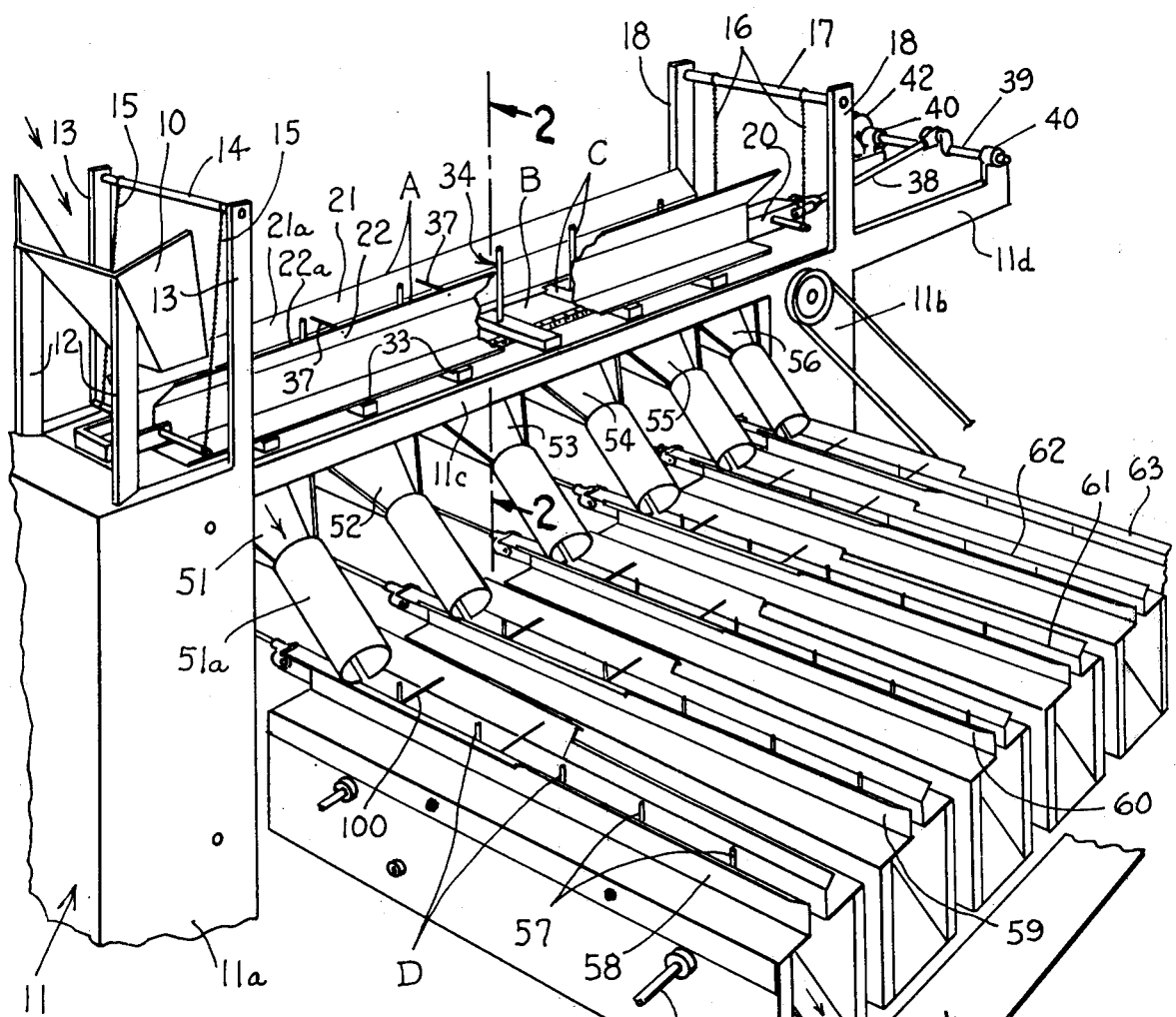
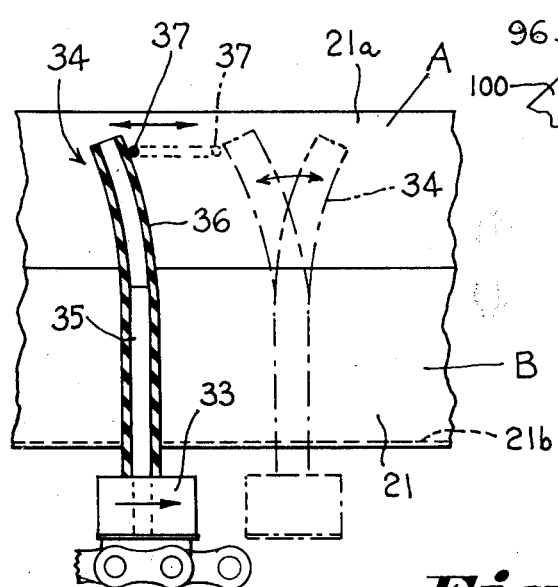
Fig. 1.
Fig. 2.

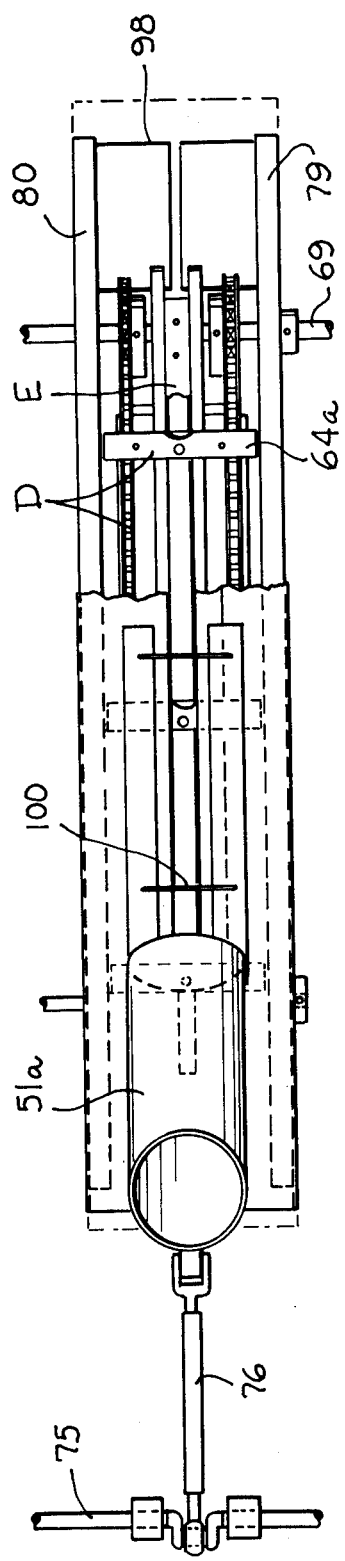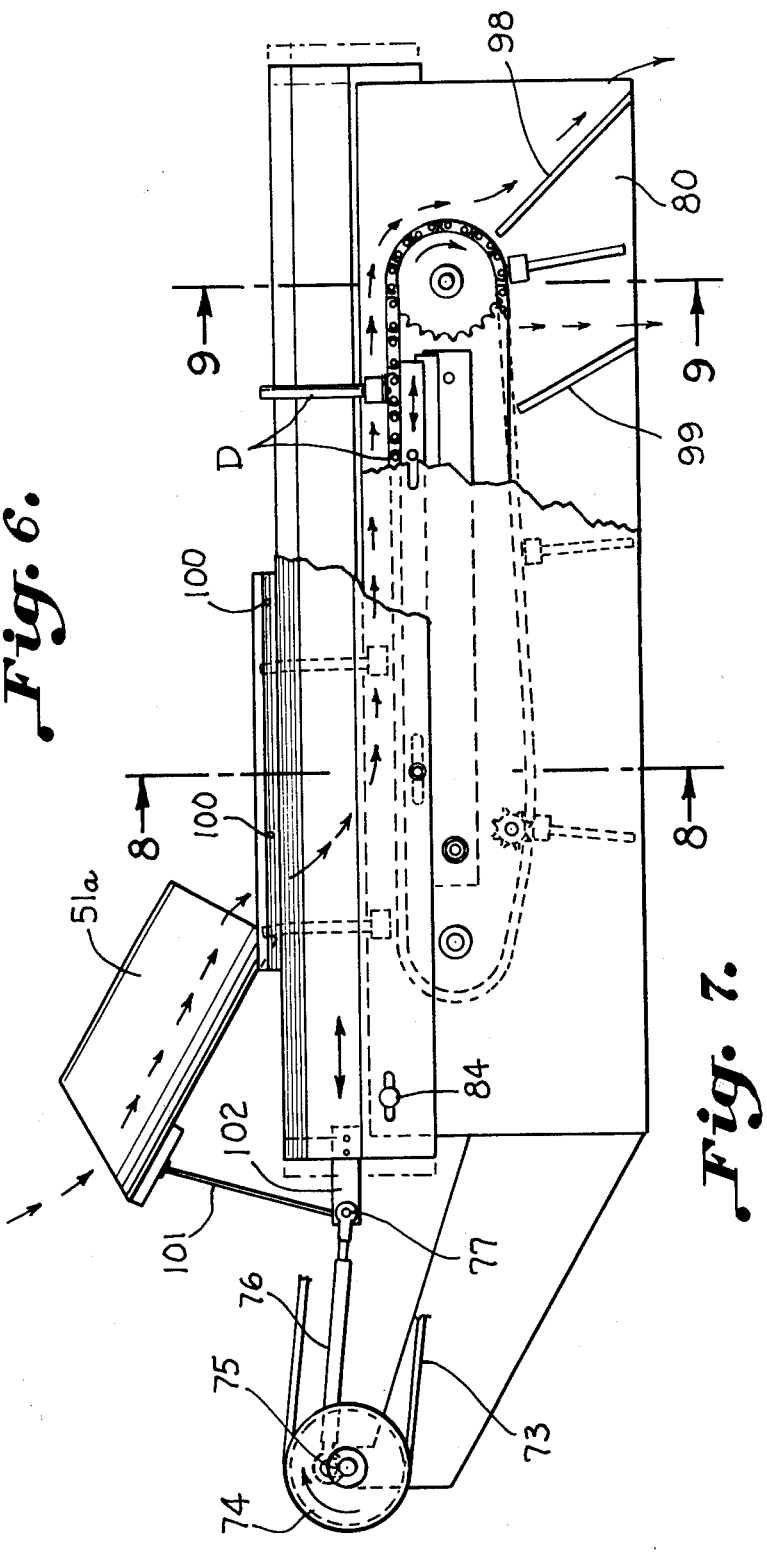

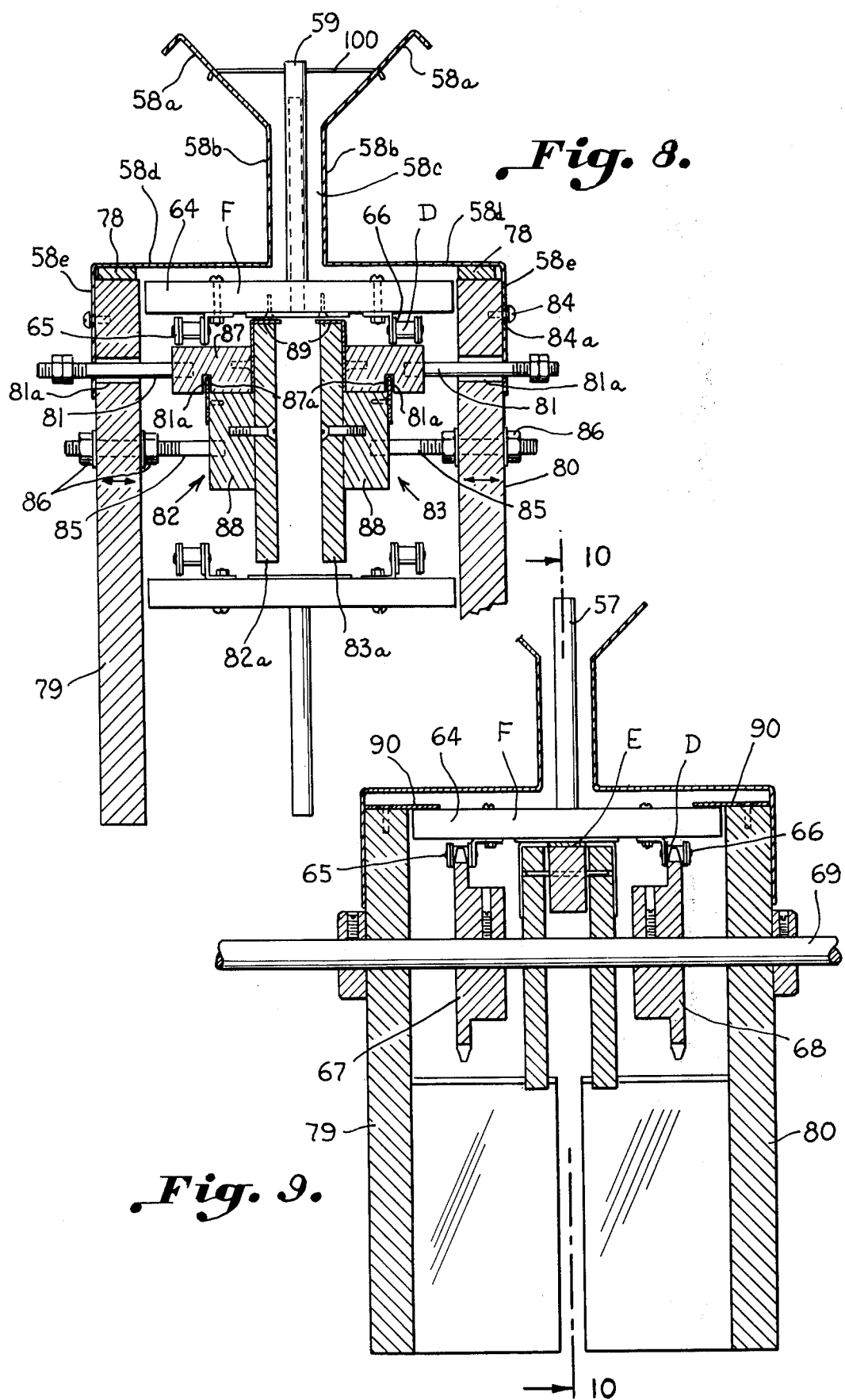

APPARATUS FOR SIZING AND DEHEADING SHRIMP

This is a continuation of application of application Ser. No. 512,452 filed Oct. 7, 1974, now abandoned.

This invention relates to an apparatus and method for sizing shrimp providing a trough having an open bottom which becomes progressively larger with sizing stations spaced from one end to the other and to a deheading apparatus and method including receiving the sized shrimp and conveying them suspended by the head with the tail down into engagement with a stationary blade where the heads are sheared off and separated from the bodies.

BACKGROUND OF THE INVENTION

Many efforts have been made to provide practical apparatus and method for deheading shrimp. Shrimp trawlers, especially the larger ones, go to sea for a number of weeks during which time it is necessary to refrigerate the catch of shrimp. Before putting the shrimp on ice or otherwise refrigerating them, it is necessary that the heads be removed. Deheading shrimp is a time consuming job requiring that personnel be taken along for carrying out the deheading operation in addition to the crew necessary for the operation of the trawler and nets.

An early effort to provide a shrimp deheading machine is described in U.S Letters Pat. No. 1,367,546 wherein deheading apparatus includes a sharp, fixed knife for deheading shrimp carried thereto in a transverse horizontal position in open conveyor compartments. Such apparatus has the advantage of deheading shrimp through a shearing action of sorts but the difficulty inherent in positioning the shrimp in the compartments carried by the conveyor and maintaining them so positioned under engagement with the blade has evidently rendered the device impractical.

It is more often the case that a rotating, sharp knife is used for severing the heads of shrimp from the bodies as illustrated in U.S. Letters Pat. No. 3,698,038. The device of this patent is somewhat similar to that just described above except that the cutting blade rotates. This more complicated apparatus possesses a disadvantage, therefore, in that there is less tendency to remove undesirable parts of the shrimp and it is more likely that part of the meat of the body portion may be severed by the sharp blade and discarded together with the head. Some of the other efforts to provide a suitable shrimp deheading mechanism are illustrated in U.S. Letters Pat. Nos. 2,958,896, 3,281,889 and 3,451,100.

Accordingly, it is an important object of this invention to provide an apparatus and method facilitating the deheading of raw shrimp which will obviate the necessity for taking persons in addition to the regular crew on extended trips at sea for the purpose of deheading the shrimp catch.

Another important object of the invention is the provision of a sizing apparatus wherein shrimp whether headed or deheaded, raw or cooked, may be accurately sized through a simple method and employing a minimum of moving parts.

Another important object of the invention is the provision of a deheading apparatus which may be operated independently of the sizing apparatus and which permits shrimp which have already been sized to be deheaded through the use of a shearing action which results in the removal of part of the intestines of the shrimp together with the head.

Another object of the invention is the provision of a versatile apparatus which may be used for sizing or deheading or both and which is adaptable to use at sea as well as in the plant.

The machine may also be used at receiving stations where shrimp are off-loaded from boats for deheading and marketing. The costs of deheading, now done manually, could be appreciably reduced by using a machine constructed in accordance with the present invention. The "deheaders" now refuse to dehead the smaller sizes of shrimp which are sent to canners for processing. These smaller shrimp, when deheaded by such a machine, would be thus more readily available to those who cannot afford the larger size shrimp.

SUMMARY OF THE INVENTION

It has been found shrimp may be sized utilizing an open trough having an open bottom wherein the opening becomes progressively larger from one end of the trough to the other and wherein fingers or pins project upwardly through the open bottom for separating and moving the shrimp along the trough allowing the shrimp to fall through the open bottom when the opening becomes large enough to accommodate the individual shrimp. It is desirable that the deheading apparatus be positioned to receive the thus sized shrimp at a number of stations spaced along the trough and for conveying them to a stationary blade which is preferably dull or flat permitting an abutment carried by the conveying means to pass over the stationary blade shearing off the heads at the joint and carrying the heads over the blade to be collected separately from the bodies.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 1 is a perspective view illustrating sizing and deheading apparatus for carrying out the method of the present invention.

FIG. 2 is an enlarged side elevation taken on the line 2—2 in FIG. 1 illustrating upwardly projecting fingers for conveying the shrimp along the diverging bottom of the sizing trough, FIG. 6 is a top, plan view illustrating deheading apparatus constructed in accordance with the present invention, FIG. 7 is a side elevation illustrating deheading apparatus constructed in accordance with the present invention, FIG. 8 is an enlarged, transverse sectional elevation taken on the line 8—8 in FIG. 7, FIG. 9 is an enlarged, transverse sectional elevation taken on the line 9—9 in FIG. 7.

DESCRIPTION OF A PREFERRED EMBODIMENT

Figure 3:
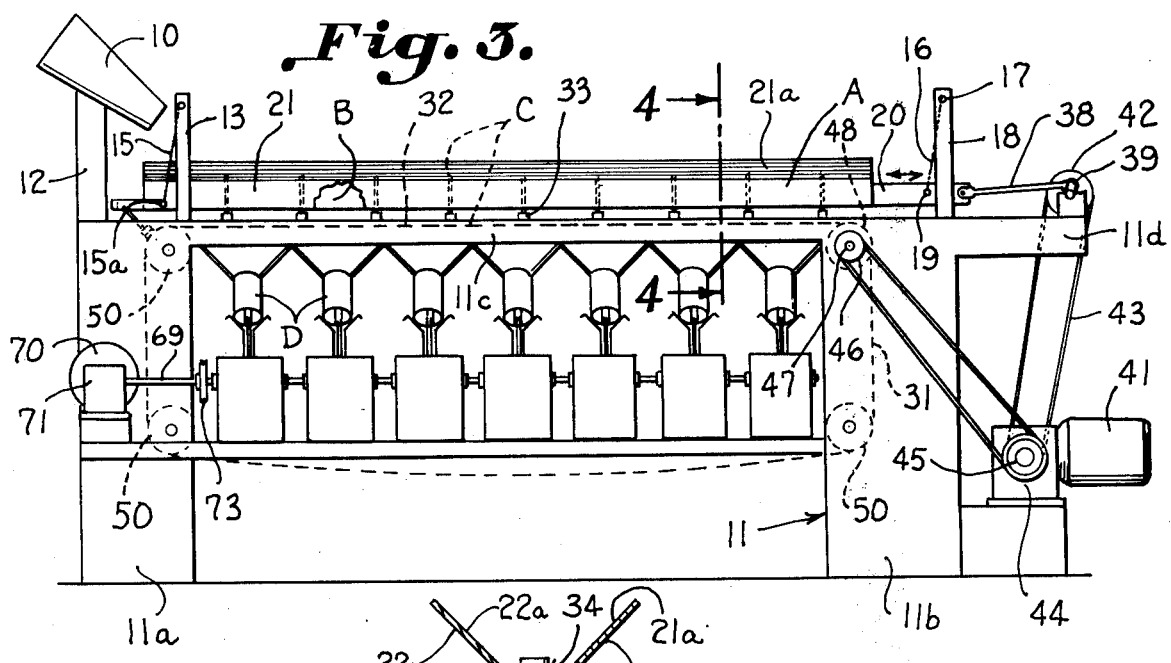
FIG. 3 is a side elevation of the sizing and deheading apparatus illustrated in FIG. 1 illustrating the various drive mechanisms.

The drawings illustrate apparatus for sizing and deheading raw shrimp including an open, elongated trough A having an open bottom for receiving raw shrimp. The trough includes a pair of sides diverging laterally outwardly from adjacent one end of the trough providing a progressively larger opening B for the passage of shrimp through the open bottom. Means C are provided for moving the raw shrimp along the trough in the direction of divergence of the open bottom permitting progressively larger shrimp thus sized to fall by gravity through the open bottom. Conveyor means D carry sized shrimp suspended therefrom by a head of each shrimp with a body portion depending from a joint therebetween from the trough toward and into contact with a stationary blade E. Each shrimp is so oriented that contact by the shrimp with the blade occurs adjacent a joint between the head and the body of the shrimp. A plurality of abutments F are carried by the conveyor means for pushing the head of each shrimp toward said stationary blade successively passing on one side of the stationary blade causing the heads to be sheared off adjacent the joint.

The sizing apparatus is best illustrated in FIGS. 1, 2, 3, 4 and 5. The deheading apparatus which is illustrated in the remaining drawings is preferably associated with the sizing apparatus providing a unitary device for both sizing and deheading the shrimp. However, the sizing apparatus could be used separately wherein it is desired that a process involving additional steps such as completely preparing the shrimp for packaging be carried out immediately after sizing. The deheading operation illustrated herein may be carried out utilizing shrimp which have been sized by any suitable apparatus or method.

The sizing apparatus preferably includes a chute or hopper 10 into which the shrimp are loaded in any desirable fashion such as in batches for delivery to the trough A adjacent one end thereof. The chute 10 is carried by suitable fixed framework broadly designated at 11 as is the trough A and associated parts. The framework 11 includes a pair of spaced vertical supports 11a and 11b which are bridged by a horizontal support section 11c. A cantilevered support section 11d extends outwardly from the vertical support 11b on an end of the frame opposite the chute 10. The chute 10 is illustrated as being carried by a pair of vertical supports 12 carried by the vertical frame support 11a. The chute 10 has a lower end which directs the shrimp into an adjacent end portion of the open trough A.

The trough A is suspended on the end adjacent the chute 10 from a pair of spaced, aligned standards 13. The standards 13 carry a transverse bar 14 from which spaced chains 15 are suspended for attachment to the adjacent end of the trough A as at 15a. The other end of the trough A is suspended from spaced chains 16 carried by a transverse bar 17 which is, in turn, carried by spaced aligned standards 18. The chain is illustrated as being attached adjacent outer ends of a horizontal bar 19 which passes horizontally through a block 20 carried by the opposite end of the trough A.

Figure 4:
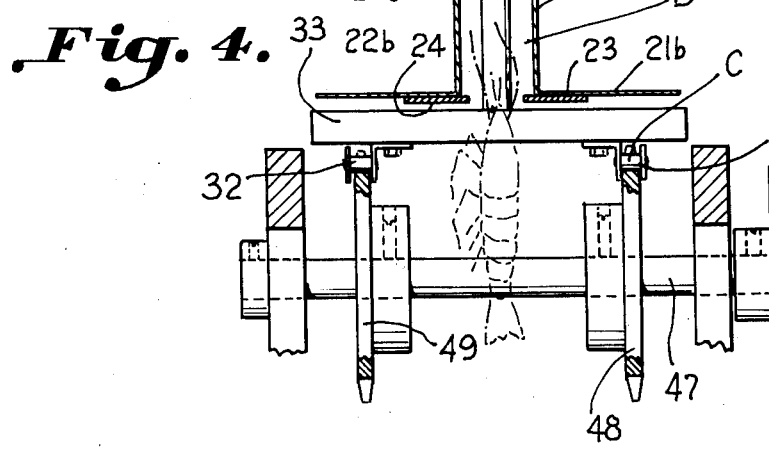
FIG. 4 is an enlarged transverse sectional elevation taken on the line 4—4 in FIG. 3, illustrating a shrimp falling between the catch plates of the diverging bottom.

The trough A is illustrated as having an open top defined by a pair of diverging sides 21 and 22, each of the sides 21 and 22 having respectively downwardly converging upper members 21a and 22a. Each of the sides further include laterally extending lower portions 21b and 22b respectively (FIG. 4). Each of the respective upper and lower members of the sides 21 and 22 are bridged by intermediate substantially vertical portions 21c and 22c.

Figure 5:
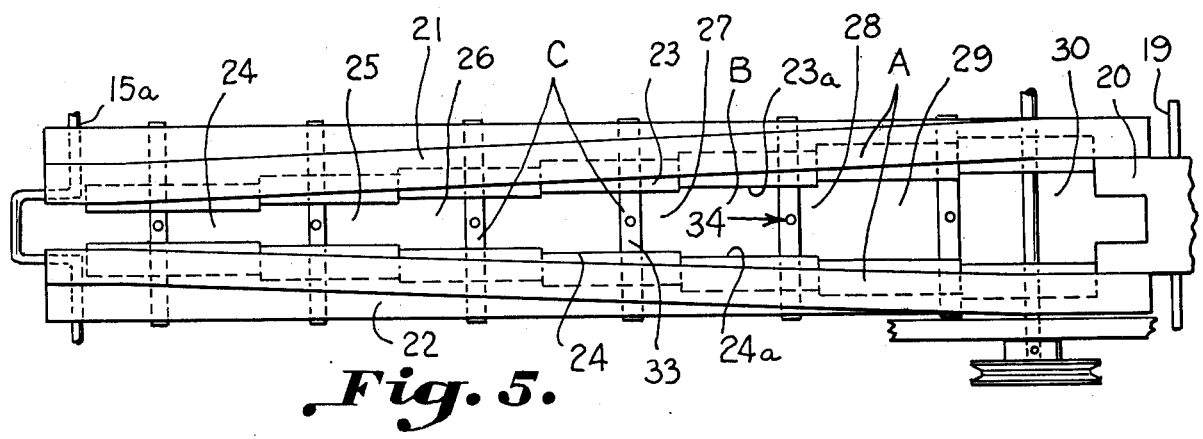
FIG. 5 is a top, plan view with parts broken away and parts omitted, illustrating catch plates of sizing apparatus constructed in accordance with the present invention.

The side members 21 and 22 diverge from an end adjacent the chute 10 toward an opposite end, as is best illustrated in FIGS. 1 and 5, so as to define an open bottom portion B which becomes progressively larger from one end to the other. As is best illustrated in FIGS. 4 and 5, suitable catch plates 23 and 24 are spaced along respective sides 21 and 22. The sides 21 and 22 are bridged on one end by the bar 15a which is attached to the suspension chain 15 and on the other end by the block 20. As is also best illustrated in FIG. 5, the sides of the catch plates 23 and 24 are parallel as illustrated at 23a and 24a. As illustrated, the distance between the catch plates 23 and 24 is made progressively larger from one end of the trough A to the other in increments representing the spacing between respective spaced pairs of plates 23 and 24. These incremental spaces are illustrated in FIG. 5 from smaller to larger as at 25, 26, 27, 28, 29 and 30.

Conveyor means C are provided for moving the raw shrimp along the trough in the direction of divergence of the open bottom permitting progressively larger shrimp to fall by gravity through the open bottom. The conveyor means C generally includes opposed conveyor chains 31 and 32 which are bridged by spaced flats 33 which carry upwardly extending fingers 34 which project upwardly between the catch plates 23 and 24 and into the progressively larger opening B between the respective side members 21 and 22 forming the trough A.

The fingers, broadly designated at 34 are illustrated in FIG. 2 as preferably including a vertical pin 35 constructed of rigid material which may carry a flexible sleeve 36 as constructed of rubber and the like. A plurality of striker bars 37 are spaced along the trough and are carried between respective sides 21 and 22. When the free upper portion of a flexible resilient sleeve 36 engages a striker bar 37 as it is moved forward by the chain, it has a tendency to vibrate back and forth as illustrated in broken lines in FIG. 2 causing agitation of the shrimp carried between the fingers. The apparatus including flats 33 and fingers 34, attached to the chain actually lean or are rocked backward about 15° when passing under the striker bars 37. A snapping action occurs upon disengagement thereof with the striker bars 37. Further agitation is provided by oscillating the entire trough back and forth as through the use of a pitman rod 38 which is connected on one end to the block 20 and on the other to an eccentric portion of a crank shaft 39. The crank shaft 39 is illustrated as being carried for rotation on suitable spaced bearings 40 carried by the cantilevered frame portion 11d.

As is best illustrated in FIG. 3, a motor 41 drives a pulley 42 carried by the crank shaft 40 for oscillating the trough A back and forth in the direction of the arrow. The motor 41 drives a belt 43 for this purpose from a suitable power takeoff (not shown) from a gear box 44. A suitable power takeoff also turns the pulley 45 which, in turn, drives a smaller pulley 46 turning the shaft 47 (see FIG. 4). The shaft 47 carries suitable sprockets 48 and 49 respectively for driving the chains 31 and 32. Additional sprockets for accommodating the upper and lower flights of the respective chains 31 and 32 are schematically illustrated in FIG. 3 in broken lines as at 50. By reference to FIGS. 1 and 3, it will be noted that each of the incremental spaces 25 through 30 provide spaced sizing stations in the form of chutes or hoppers 51, 52 53, 54, 55 and 56. These chutes form a part of the conveyor means for carrying the sized shrimp into the deheading apparatus. The conveyor means D further include fingers 57 which project upwardly through the lower portions of respective troughs 58, 59, 60, 61, 62 and 63.

Figure 10:
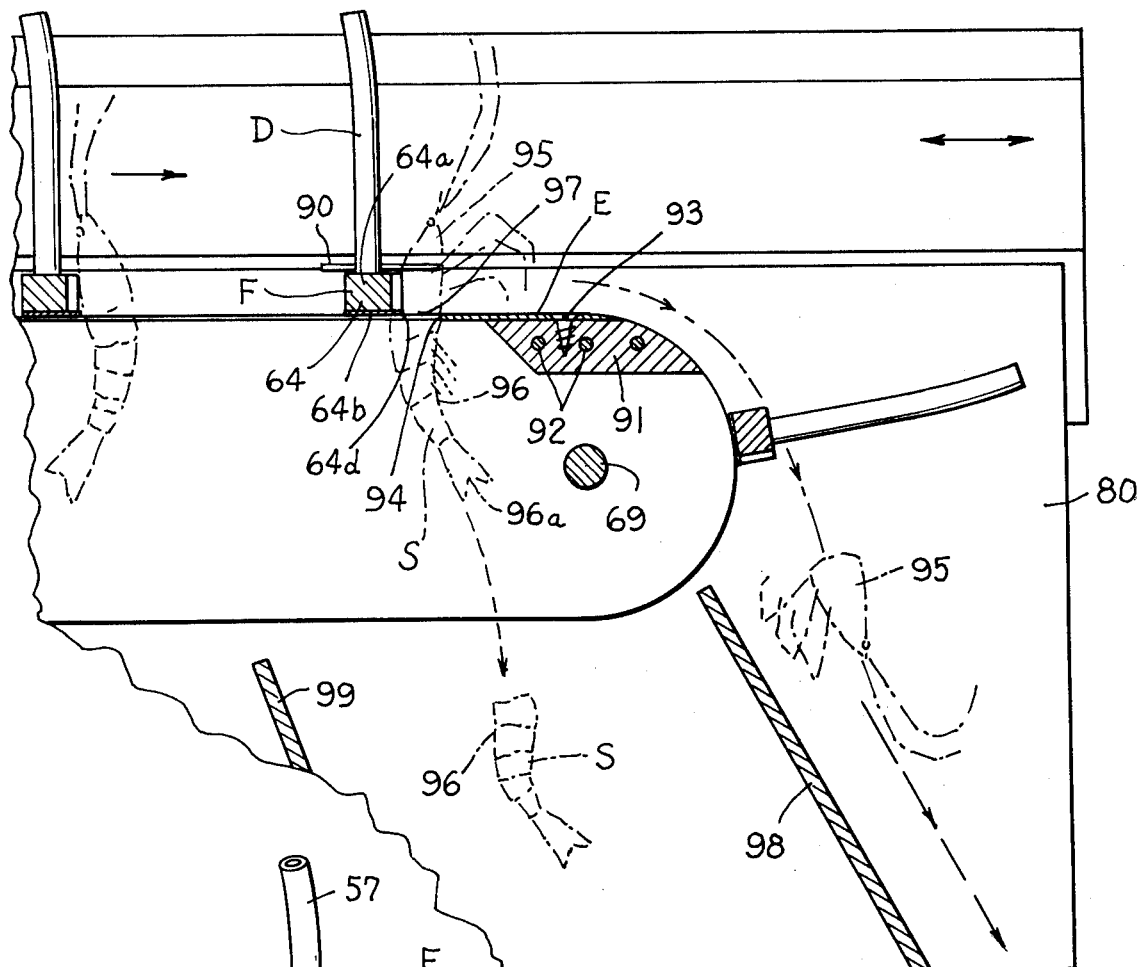
FIG. 10 is an enlarged, sectional elevation taken on the line 10—10 in FIG. 9 illustrating a blunt stationary blade for shearing off the head of a shrimp received thereby.
Figure 11:
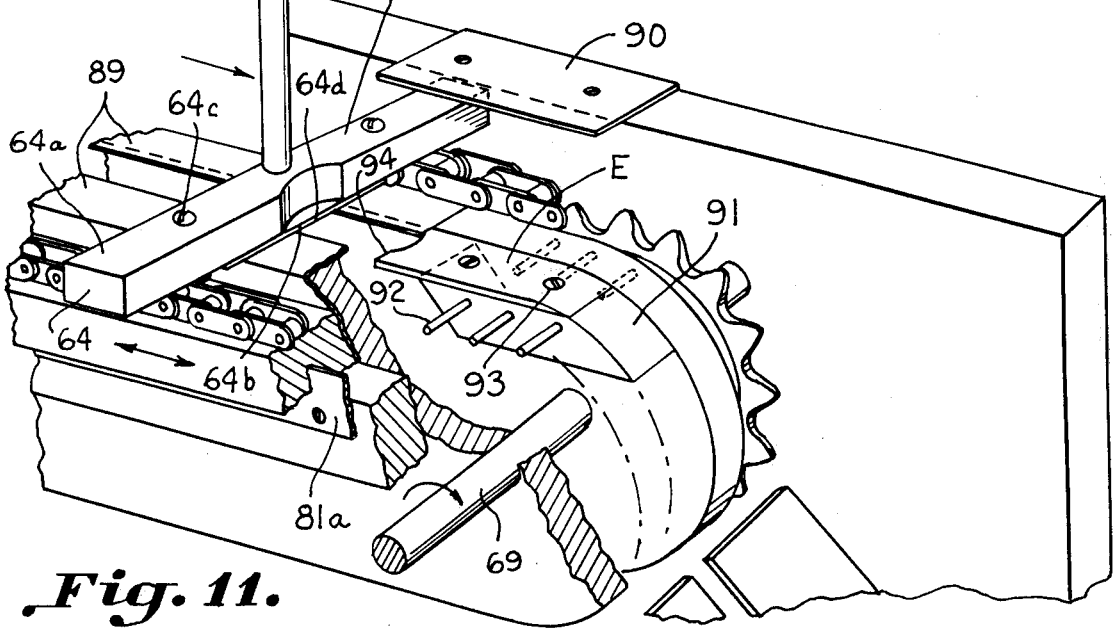
FIG. 11 is an enlarged, perspective view further illustrating the stationary blade and associated parts illustrated in FIGS. 10 and 11l.

In addition to the chutes 51–56 and the fingers 57, the conveyor means D generally include a plurality of cross abutments 64 carried between respective flights of chains 65 and 66. It should be noted that the cross abutment 64, as best illustrated in FIGS. 10 and 11, includes a cross piece 64a and a lower blade portion 64b carried horizontally thereby as by stove bolts 64c. The chains 65 and 66 are carried by sprockets 67 and 68 which are fixed to a transverse shaft 69. The shaft 69 is driven by a motor 70 (FIG. 3) through a gear box 71. The motor 70 may also through belt 73 drive the pulley 74 for driving the crank shaft 75 which, in turn, oscillates the pitman rod 76, connected as at 77 to respective troughs, to move the respective troughs 58, 59, 60, 61, 62 and 63 back and forth to position the shrimp as will be described in greater detail below.

A typical trough 58 is illustrated in FIGS. 8 and 9 including opposed downwardly converging members 58a, vertical intermediate members 58b defining a space 58c therebetween to accommodate shrimp of an appropriate size. The intermediate portion 58b carries horizontal extensions projecting laterally outwardly as illustrated at 58d carrying down turned edge portions 58e. The trough is adapted to oscillate back and forth on suitable shims 78 (FIG. 8). The shims 78 are carried by respective side members 79 and 80. The respective troughs are connected to dowels 81 extending outwardly from each side of respective catch plate assemblies broadly designated at 82 and 83 (FIG. 8). The dowels 81 extend through slots 81a in the respective side frame members 79 and 80. It will be observed that suitable holddown screws 84 extend through slots 84a in the down turned edges 58e of respective troughs.

The catch plate assemblies 82 and 83 are adjusted to vary the transverse spacing therebetween by means of the threaded members 85 which extend through the respective frame members 79 and 80 and are positioned by nuts 86. It will be observed that the blocks 87 from which the dowels 81 extend are provided with vertical guides 81a which extend upwardly from the blocks 88 carried by the catch plate assemblies 82 and 83. The guides 81a are received in spaced slots 87a carried within the block 87. The catch plate assemblies 82 and 83, in addition to the associated parts previously mentioned, include the spaced vertical frame members 82a and 83a together with catch plates 89 which project inwardly between the frame members 82a and 83a and suspend the shrimp by the head and tail down positioned as illustrated in FIG. 10.

A pair of inwardly projecting camming members in the form of depressor plates 90 are carried by the upper edges of the frame members 79 and 80 and extend inwardly over the cross pieces or flats 64 which form the abutments F. The camming members 90 are provided adjacent the stationary blade E for accurately positioning the abutments. The blade E is carried by a suitable wedge support 91 carried at a fixed position between the vertical frame members 82a and 83a which are fixed thereto as by the pins 92. The blade E is fixed to the wedge 91 as by screws 93 and has a flat or blunt forward edge 94. It will be observed that the abutment blade 64b of the abutment 64 has a corresponding flat edge 64d. As illustrated in FIG. 10, the shrimp S has a head 95 and a body portion 96. The body portion 96 has a tail 96a and the top and body portion are joined by a joint 97 therebetween.

It will be observed in FIG. 10 that the abutment F shears off the head 95 which passes over the blade E and downwardly onto a partition 98 while the body portion 96 falls downwardly for collection separate from the head 95 as upon the partition 99. The agitation furnished by movement of the fingers 57 carried by the cross pieces or abutments F may be increased by the flexible sleeve 57a carried by a pin 57b extending upwardly from the abutments F. The transverse snapper wires 100, similar to the cross pieces 37 used in connection with the sizing apparatus provide agitation for separating and positioning the shrimp as fed into the lower portion of the trough 51. The lower portion of the trough 51 has an extension illustrated at 51a in FIG. 7 and is fixedly supported by the frame member 101 carried by the block 102 which is fixed with respect to the trough 58 and to which the pitman rod 76 is connected as at 77.

Operation

It will be observed that raw shrimp are fed from the chute 10 to the trough A adjacent one end thereof. By providing an open bottom B diverging from one end of the trough toward an opposite end, the shrimp may fall therethrough when the opening is of sufficient size to accommodate them. By moving a plurality of spaced elements in the form of fingers of the conveying mechanism C, the shrimp are separated and fed along the trough from one end to the other. While the trough A is illustrated as being of linear configuration, it is conceivable that such may be arcuate. The fingers project upwardly through the open bottom B as best illustrated in FIGS. 1 through 5. The catch plates 23 and 24 vary the size of the opening B incrementally and the respective chutes 51–56 form sizing stations along the trough A, each of which accommodates a deheading apparatus. The respective deheading devices illustrated in FIG. 1 include troughs 58–63 which receive shrimp of different sizes from the respective sizing stations or chutes 51–56.

The distance between respective catch plates 89 of respective troughs 58–63 are adjusted or predetermined to accommodate shrimp of the size delivered thereto so that the shrimp are suspended by the head with a body portion depending from a joint therebetween with the tails down. The agitation caused by oscillation of the respective troughs 58–63 together with the action of the upwardly extending fingers 57, orient the shrimp with the heads confined between the catch plates 59. The shrimp are separated and conveyed by the fingers into contact with the horizontal stationary blade E and a force exerted against the head by the abutment F for causing the heads to pass over the blade and be separated as by the partition 98, the tail portions passing on to conveyor 100 and the heads to conveyor 101 (FIG. 1). The conveyor 101 collects sized deheaded shrimp from the trough 58, suitable separate conveyors (not shown) as running at right angles beneath the conveyor 101 may be provided for each remaining trough provided to collect sized deheaded shrimp. It is not necessary that a single shrimp be engaged between the abutment F and the blade E as several may be therebetween at one time and the heads successively sheared off as the conveyor advances. Some of the edible meat extends into the head beyond the joint where shrimp are suspended. The shearing action of this apparatus, as opposed to a sharp revolving severing device, allows the shrimp to orient, shift or move so that all the meat is recovered when the head is severed.

While a preferred embodiment of the invention has been described using specific terms, such description is for illustrative purposes only, and it is to be understood that changes and variations may be made without departing from the spirit or scope of the following claims.

What is claimed is:

1. A shrimp deheading apparatus comprising:
   a stationary blade;
   conveyor means carrying shrimp positioned for reception against said blunt blade adjacent a joint between a head and a body portion; and
   an abutment carried by said conveyor means pushing the head of each shrimp toward said stationary blade, said abutment passing thereby causing said heads to be sheared off adjacent said joint separating said head and body.

2. The structure set forth in claim 1, wherein said conveyor means includes a pair of spaced chains having substantially horizontal upper runs and wherein said blade is carried between said runs.

3. The structure set forth in claim 2 including an open trough over said conveyor means, said conveyor means including a pair of spaced plates for suspending said shrimp.

4. The structure set forth in claim 3 wherein said conveyor means further includes fingers projecting upwardly between said plates into said trough carried by spaced abutments.

5. The structure set forth in claim 4, including:
   cam means positively positioning said chains and the abutments carried thereby on opposite sides of said blade.

6. A shrimp sizing apparatus comprising:
   an elongated trough open at the top and the bottom;
   means feeding shrimp into said trough adjacent one end of the trough;
   said trough including a pair of sides stationary with respect to each other diverging laterally outwardly from adjacent said one end providing a progressively larger opening in said bottom;
   spaced flexible fingers projecting into said trough moving longitudinally therein in a direction away from said feeding means separating and conveying shrimp along said trough from said feeding means toward an opposite end of said trough; and
   a plurality of spaced elements carried across said trough for engagement by said fingers for imparting vibration thereto;
   whereby said shrimp pass from along said progressively larger opening in said bottom until said opening is sufficiently larger to permit passage of the shrimp therethrough.

7. Apparatus for sizing and beheading raw shrimp including:
   an open, elongated trough, having an open bottom, for receiving raw shrimp;
   said fixed with respect to each other trough having a pair of sides diverging laterally outwardly from adjacent one end of the trough providing a progressively larger opening for the passage of shrimp through the open bottom;
   means for moving the raw shrimp along the trough in the direction of divergence of the open bottom permitting progressively larger shrimp thus sized, to fall by gravity through the open bottom;
   a stationary blade having a blunt edge
   conveyor means carrying sized shrimp from the trough toward and into contact with the stationary blade;
   said conveyor means orienting each shrimp so that contact by the shrimp with the blade occurs adjacent a joint between the head and the body of the shrimp; and
   a plurality of abutments carried by the conveyor means for pushing the head of each shrimp toward said stationary blade successively passing on one side of the stationary blade causing the heads to be sheared off adjacent the joint.

8. Apparatus for positioning shrimp for processing comprising:
   an elongated trough having an open top and an open bottom for receiving shrimp;
   opposed, horizontal plate catch members fixed on opposite sides of said open bottom;
   each shrimp being suspended by a head from said catch members with a body depending therefrom;
   a plurality of spaced fingers extending upwardly through said open bottom between said catch members; and
   conveyor means moving said fingers successively into and along said trough for separating and positioning said shrimp for processing.

* * * * *